G. KOEHLER.
BORING TOOL.
APPLICATION FILED MAY 1, 1919.
1,327,049.
Patented Jan. 6, 1920.
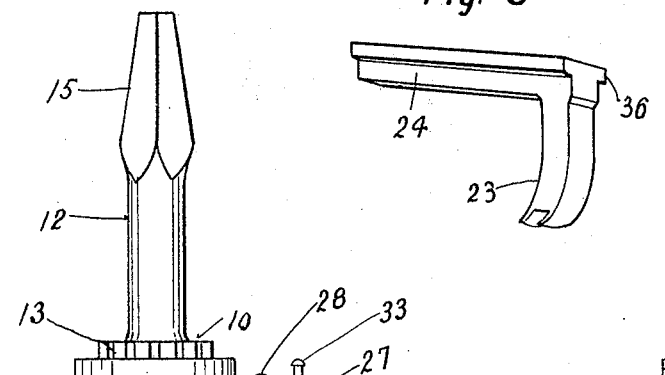
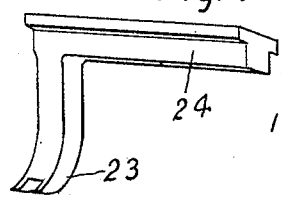
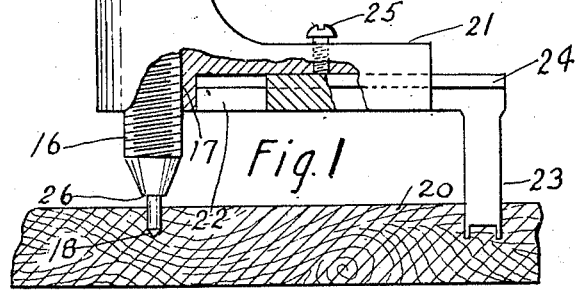
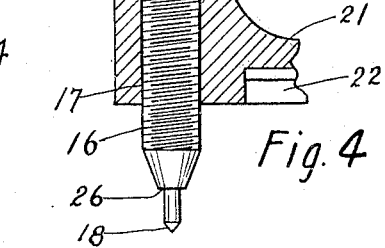
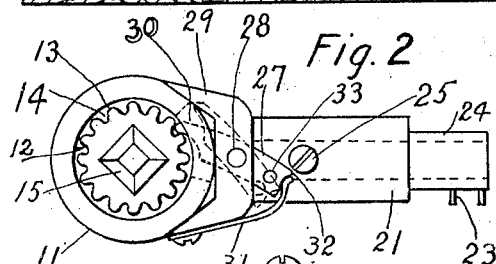
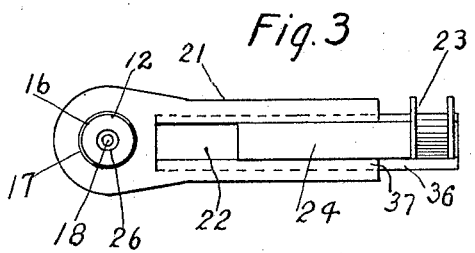
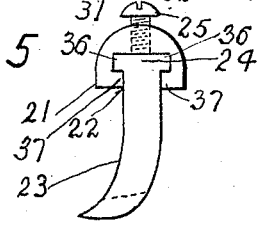
Inventor:
George Koehler,
by D. P. Werbsler
His Attorney.

UNITED STATES PATENT OFFICE.

GEORGE KOEHLER, OF CINCINNATI, OHIO.

BORING-TOOL.

1,327,049.  Specification of Letters Patent.  Patented Jan. 6, 1920.

Application filed May 1, 1919. Serial No. 294,115.

*To all whom it may concern:*

Be it known that I, GEORGE KOEHLER, a citizen of Austria, residing in Cincinnati, in the county of Hamilton and State of Ohio, have invented certain new and useful Improvements in Boring-Tools, of which the following is a specification.

My invention relates to boring tools, and has for its object the provision of a new and improved boring tool whereby holes of various sizes and of large diameters may be bored in wood or the like.

It is the object of my invention, further, to provide a novel boring tool of the character mentioned, which has a centering and depth-limiting inner member which supports a revolving tool-arm, the latter having a cutter-bit adjustable thereon, so that large and various sized holes can be accurately and speedily bored.

The invention will be further readily understood from the following description and claim, and from the drawing, in which the latter:

Figure 1 is a side elevation of my improved device, partly broken away.

Fig. 2 is a plan view of the same.

Fig. 3 is a bottom view of the same.

Fig. 4 is a central axial section of my improved device, partly broken away.

Fig. 5 is an end view of the cutter-bit holding means.

Fig. 6 is a perspective view of one of the cutter-bits and slides; and,

Fig. 7 is a perspective view of another of the cutter-bits and slides.

A casing 11 has a shank 12 adjustable therein. The shank comprises a toothed part 10, the teeth 13 of which extend through a considerable portion of the length of the shank, the toothed portion being received in a bore 14 of the casing. The shank further comprises an attaching end 15, by means of which the boring tool is attached to the brace, rotatable spindle, or other operating device. The part 15 may be of any suitable form. The shank further comprises a screw-threaded portion 16, which is threaded in the internally threaded bore 17 of the casing. There is an entering stem 18 at the entering end of the shank acting as a centering part for the boring tool.

The casing has an arm 21 extending therefrom, the arm being rigid with the casing. The arm has a guideway 22 extending lengthwise of its bottom and radial with relation to the casing and the shank. A cutter-bit 23 is on a slide 24 which is adjustable lengthwise in the guideway 22, and is clamped in adjusted positions by means of a set-screw 25.

The shank 12 is rotatable in the casing for raising and lowering the point of the entering stem 18 with relation to the cutting edge of the cutter-bit 23. An end-limiting face 26 is at the upper end of the entering stem 18, and forms a shoulder which acts as a limiting shoulder or resting face to limit endwise movement of the stem 18 and to limit end movement of the shank 12 toward the wood which is being bored, the wood being shown at 20.

The object of rotating the shank within the casing is to axially position the centering stem 18 and shoulder 26 with relation to the casing and the cutter-bit, so as to project the cutting edge of the cutter-bit progressively greater distances below the plane of the shoulder, as the cutting edge progresses downwardly into the wood during the cutting operation.

For causing rotation of the casing with the shank, a pawl 27 is arranged to engage the teeth 13. The pawl is pivoted on a pin 28 passing through bearing-brackets 29 on the casing and through a slot 30 through the casing into engagement with the teeth. A spring 31 contacts the pawl and holds the pawl either in tooth-engaging position by contact of the spring with one side of the heel 32 of the pawl, as shown in full lines in Fig. 2, or in release position, by pushing the heel 32 to the other side of the engaging portion of the spring, and thereby holding the pawl in disengaged relation to the teeth, as indicated in dotted lines in Fig. 2. The pawl may be provided with a pin 33 by means of which to move the pawl.

It will be instanced that a hole of large diameter is to be made in a wood board, say one inch thick. The slide 24 of the cutter-bit 23 is adjusted in the guideway 22 to correspond to the radius of the hole. The slide 24 is exemplified as having lateral projections 36 received over the inwardly extending projections 37 of the arm, square shoulders being preferably formed between said projections. The set-screw 25 bears against the top of the slide for clamping the slide in adjusted position.

The point of the entering stem 18 is indented into the board, at the center of the proposed hole the stem preferably entering the board sufficiently to steady the boring tool. Upon the boring tool being rotated, the cutter-bit enters the wood in an annular path corresponding to the outer circumference of the hole. The progress of the cutter-bit into the wood continues upon continued rotation of the boring tool, until the limiting shoulder 26 reaches the upper surface of the board, whereby the axial movement of the boring tool toward the board is stopped. Rotation of the shank 12 is then reversed, causing reverse rotation of the shank relative to the casing, the casing remaining stationary during such reverse rotation, whereby the lower end of the shank is moved into the casing, thereby raising the shank by means of its screw connection in the casing.

This reverse rotation may be facilitated by withdrawing the pawl 27 from contact with the teeth 13, as by moving the pawl by means of the pin 33, so that its heel 32 is moved past the outer end of the spring 31 for holding the pawl in release position with relation to the teeth. After the shank has been reversely rotated a sufficient number of revolutions to withdraw the limiting face or shoulder 26 sufficiently from the board, the pawl is again caused to engage with one of the teeth, and rotation of the shank in the cutting direction again proceeds, whereby the cutter-bit 23 is caused to enter deeper into the board, until the limit of its entering movement has been again reached by contact of the shoulder 26 with the face of the board. The rotation of the stem is then again reversed for further withdrawal of the threaded shank into the casing to permit a further descent of the cutter-bit, whereupon the pawl is again caused to positively engage one of the teeth, and rotation of the shank and casing in cutting direction is again effected, the operations being repeated until the cutting edge of the bit passes through the board. The disk of wood inside the circle of the cut is then removed from the hole. The cutting of the hole proceeds stepwise, permitting extreme accuracy in the cutting and avoiding breaking or damage to the cutter-bit and boring tool.

If a small hole is to be bored, a cutter-bit is employed at the inner end of the slide, so as to place the cutter-bit at the inner end of the guiding faces of the slide. Such an arrangement is shown in Fig. 7, in which the cutter-bit 23' is at the inner end of the slide 24', as distinguished from the form shown in Fig. 6, in which the cutter-bit 23 is at the outer end of the slide 24.

Having thus fully described my invention, what I claim as new and desire to secure by Letters Patent, is:

A boring tool comprising a central shank having a long toothed portion, a threaded portion and a lower centering portion, said shank having a limiting shoulder at the upper end of said centering portion, a casing received about said shank, said casing provided with a bore in which said toothed portion is received and with a threaded bore coacting with said threaded portion of said shank, a pawl on said casing coacting with the teeth of said tooth portion, said casing having a radially projecting arm provided with a guideway, a slide adjustable in said guideway, and a cutter-bit on said slide, constructed and arranged whereby axial adjustment of said shank in said casing by means of said screw-threads adjusts the plane of said shoulder with relation to the plane of the cutting edge of said bit, and said shank arranged to be rotated in cutting direction with said casing and in opposite direction relative to said casing.

In testimony whereof I have hereunto signed my name in the presence of two subscribing witnesses.

GEORGE KOEHLER.

Witnesses:
   DAWSON E. BRADLEY,
   PAUL V. CONNOLLY.